United States Patent [19]

Grill

[11] Patent Number: 5,299,656
[45] Date of Patent: Apr. 5, 1994

[54] JAW HORSE ASSEMBLY AND METHOD

[76] Inventor: Thomas W. Grill, P.O. Box 4282, Enterprise, Fla. 32725

[21] Appl. No.: 893,145

[22] Filed: Jun. 2, 1992

[51] Int. Cl.⁵ .......................................... F16M 11/00
[52] U.S. Cl. .................................. 182/181; 182/224; 269/289 MR
[58] Field of Search .......................... 182/153–155, 182/181–186, 224–227; 269/289 MR

[56] References Cited

U.S. PATENT DOCUMENTS

| Re. 23,097 | 4/1949 | Imes | 182/226 |
|---|---|---|---|
| 140,858 | 7/1873 | Tilley | 182/153 X |
| 841,931 | 1/1907 | Chesebro | 182/181 |
| 2,158,939 | 5/1939 | Hussey | 182/226 |
| 2,611,570 | 9/1952 | Kroll | 182/225 X |
| 4,375,245 | 3/1983 | Schill | 182/182 X |
| 4,492,354 | 1/1985 | Rice | 182/182 X |

FOREIGN PATENT DOCUMENTS

| 18495 | 11/1988 | European Pat. Off. | 269/289 MR |
|---|---|---|---|
| 2218233 | 10/1973 | Fed. Rep. of Germany | 182/226 |
| 561298 | 4/1957 | Italy | 182/186 |
| 2126306 | 3/1984 | United Kingdom | 182/224 |

Primary Examiner—Alvin C. Chin-Shue
Attorney, Agent, or Firm—Hobby & Beusse

[57] ABSTRACT

A jaw horse apparatus and method for using the same to support materials. The apparatus includes an adjustable bi-leg assembly which has a set of jaws which engage with a main elongated portion of a uni-leg assembly to form a three leg support. The main portion has an aperture which receives a rod holding an elongated head piece that has an adjustable hinge. An extension arm attaches to the leg of either the uni-leg or bi-leg assembly. The head piece and extension arm may be combined with head pieces on other jaw horse apparatuses or may be used separately to support various materials. The head piece may be a roller type, ball head type or a flat drilled head type, depending on the use of the apparatus. The apparatus when not in use may be folded up into a flat package.

20 Claims, 2 Drawing Sheets

JAW HORSE ASSEMBLY AND METHOD

BACKGROUND OF THE INVENTION

This invention relates to a method and apparatus for supporting materials and more particularly to a tri-leg jaw horse which supports objects during construction.

Saw horses have been used in construction sites for resting material thereon so that the material can be cut and drilled. Conventional saw horses have two pairs of downward extending legs that attach to a main member extending across between the pairs. Horses are placed adjacent each other with flat boards resting on the main members. These flat boards create a working surface on which material is then laid.

A drawback to these horses is that they are bulky and take up a lot of room. Consequently horses cannot easily fold up to be stored. Further these horses typically have four legs. Thus when the horses are placed on uneven surfaces the working surface tends to rock. Another drawback to horses is that their maximum height is limited as their legs are fixed in length. Consequently the horses cannot be quickly and easily adapted to positioning material thereon at different height levels.

The angle of prior horses main member is fixed with respect to horizontal. It is often desirable to change the angle of the working surface to accommodate drilling or other construction tasks. A requirement in construction is to be able to use these horses to position materials at different levels so that they can be easily worked on. Prior horses have a fixed height and thus cannot accommodate working with materials placed at various levels.

Another requirement is that once the materials are placed on the saw horse and the construction on the materials completed, these materials are removed and replaced with new material. Prior horses have a rigid main member that restricts the movement of the material when laid thereon. Consequently it is often difficult to remove the completed material from the horse itself. Another objective in construction is to place material at different levels simultaneously so that different tasks can be accomplished simultaneously. Prior horses restrict the material to working at one level at a time unless many different sized horses must be used. Adding a large number of different size horses increases space requirement which is often limited on construction sites.

SUMMARY OF THE INVENTION

In the main aspect of the invention a jaw horse apparatus is provided which has a bi-leg assembly having a first and second locking member. The locking members have a leg portion and a jaw portion, where the first locking member is pivotally connected to the second locking member between the jaw portion and the leg portion. A uni-leg assembly is provided having a main portion which at one end is adapted to be removably engaged between the jaw portion. A leg is integrally connected to the main portion and extends at an obtuse angle away from the main portion. An aperture extends through the main portion in a preferably vertical orientation. An elongated rod or pipe is fed through the aperture. A removable head is supported adjacent one end of the rod when the rod extends through the aperture. A clamp is attached to the work piece and engages with the rod when the rod extends through the aperture. The clamp securely holds the rod in place to prevent the head from turning. By engaging and disengaging the clamp with the rod, the height of the head in the rod may be adjusted to accommodate different levels of working. Preferably an extension arm assembly attaches to the leg portion of the bi-leg assembly or uni-leg assembly. The extension arm assembly has a U-shaped bracket partially surrounding the leg portion and has an arm portion extending outwardly away from the bracket portion and the first and second leg portion. This extension supports material simultaneously with material being supported by the head so that different materials can be worked on at different levels simultaneously.

In another aspect of the invention a method for supporting materials is provided. This method comprises the steps of providing a vertically oriented bi-leg assembly having a first locking member with a first leg portion and a first jaw portion. The bi-leg assembly also has a second locking member with a second leg portion and a second jaw portion. The first locking member is connected with a pivot to the second locking member. The pivot is attached onto the first and second locking members between the first leg portion and the first jaw portion. A pivot is also attached onto the second locking member between the second leg portion and the second jaw portion. A uni-leg assembly is then provided having an elongated main portion and a third leg portion extending obtusely away from the main portion. The main portion engages with the first and second jaw portion.

The first, second and third leg portions rest on the ground when the main portion engages with the first and second jaw portion. An aperture is provided in the main portion while an elongated rod extends through the aperture. A first head is attached adjacent one end of the rod. The rod extends through the aperture while being supported in a vertical orientation when the main portion engages with the jaw portion and when the first, second and third leg portions rest on the ground. Preferably two or more of the jaw horse apparatuses are placed adjacent to each other while an object is supported between one or more of the attached heads of the jaw horse apparatus. In an alternate embodiment of the invention, the orientation of the main portion with respect to horizontal is changed by varying the angle of the bi-leg assembly with respect to vertical.

DESCRIPTION OF THE PREFERRED EMBODIMENTS

Figure 1:
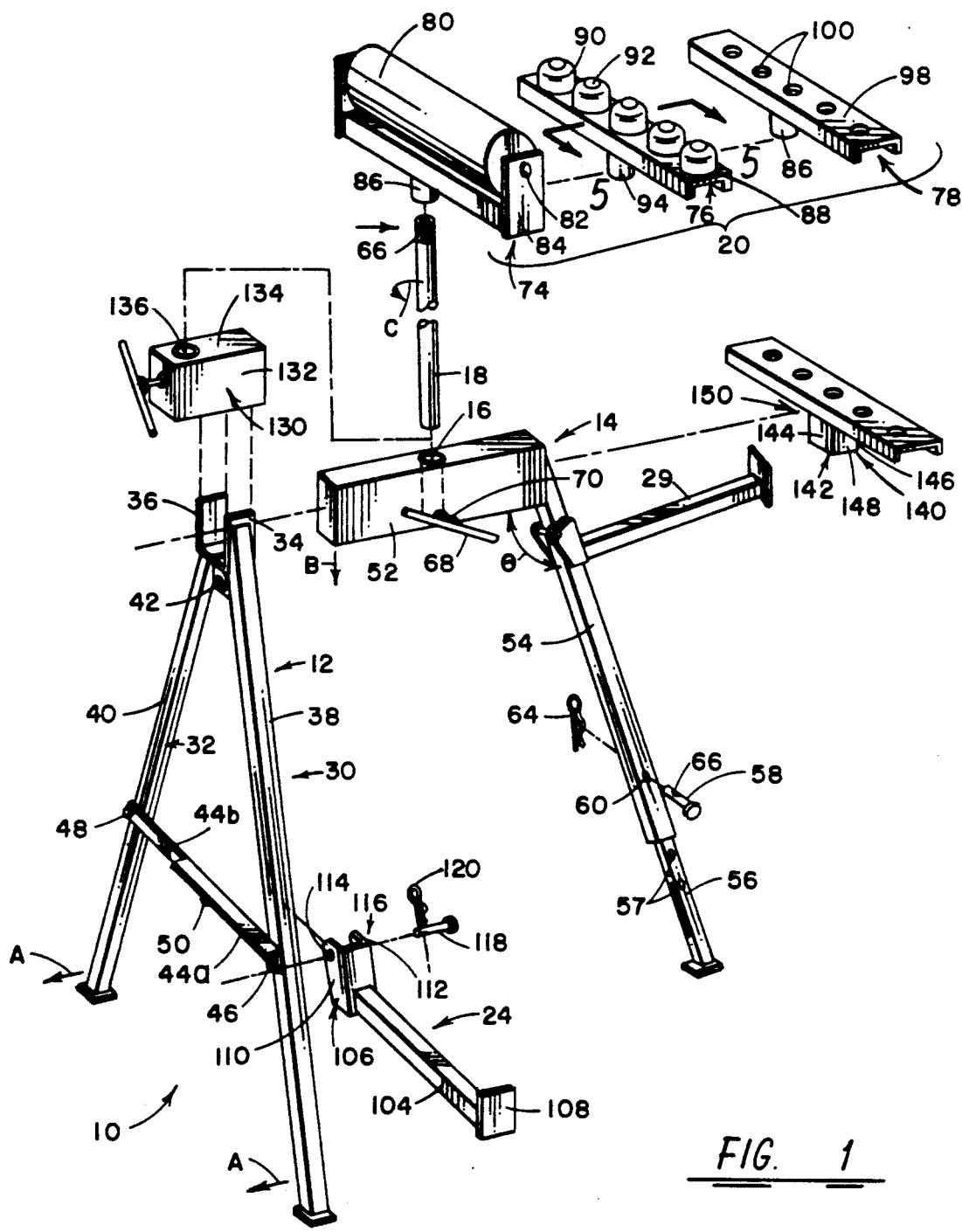
FIG. 1 is a perspective view of the jaw horse having a rod attached thereto with an interchangeable roller head, ball head or drilled head and having a detachable extension arm in accordance with the invention.
Figure 2:
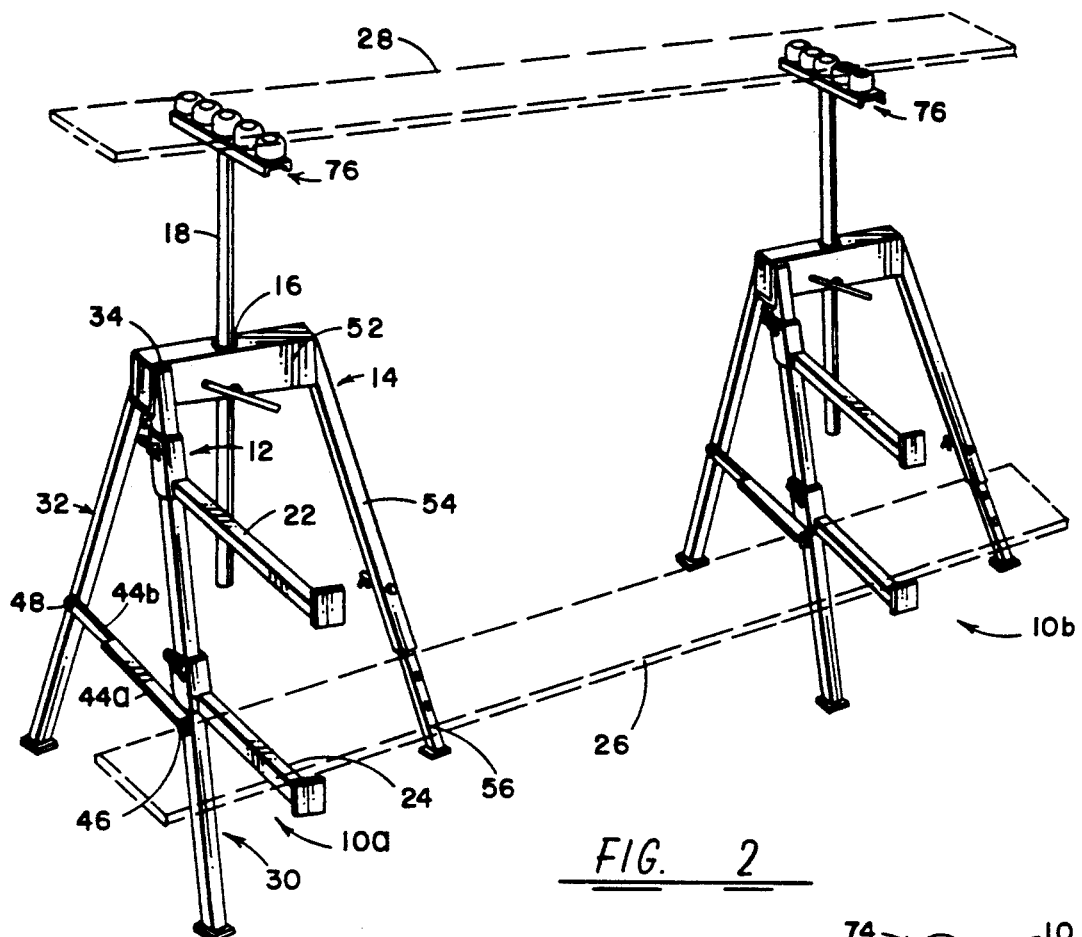
FIG. 2 is a perspective view of two jaw horses shown in FIG. 1 supporting material in accordance with the invention.
Figure 3:
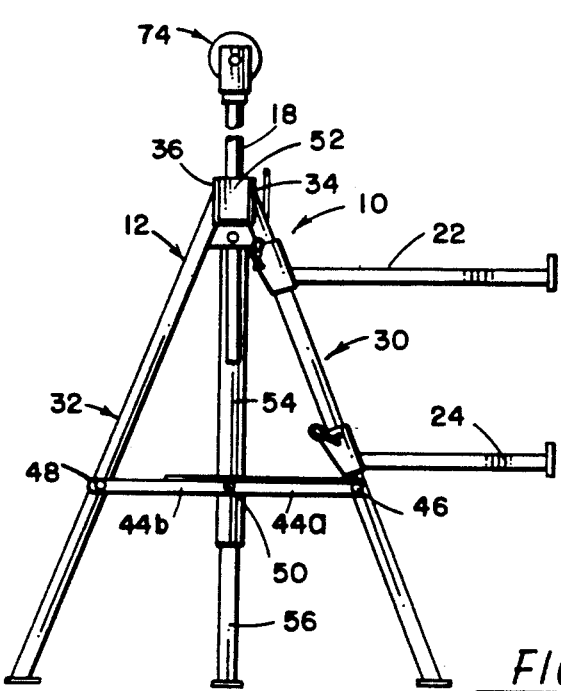
FIG. 3 is a side plan view of the jaw horse shown in FIG. 1.

Referring to FIGS. 1-3 there is shown a three-leg jaw horse apparatus designated generally by number 10. Jaw horse apparatus 10 includes a bi-leg assembly 12 engaging with uni-leg assembly 14, and resting on the ground. Extending through a cylindrically shaped aperture 16 in uni-leg assembly 14 is a rod 18 which supports a removable head 20 (FIG. 1). Attached to bi-leg assembly 12 and uni-leg assembly 14 are extension arm assemblies 22 and 24 (FIG. 2) respectively, which extend outward away from jaw horse 10 parallel to the ground. Extension arm assemblies 22 and 24 as well as removable heads 20 can be used as shown in FIG. 2 to support various material 26 and 28 respectively or objects at different levels above the ground. An extension arm assembly 29 (FIG. 1) is connected to uni-leg assembly 14.

Referring to FIGS. 1–4, bi-leg assembly 12 includes locking members 30 and 32. Each locking member has a respective L-shaped jaw portion 34 and 36 or bracket and a respective leg portion 38 and 40. It is critical that leg portions 38 and 40 are constructed with square tubing of a 14 gauge mild steel or better. A pivot 42 connects locking member 30 to locking member 32 between jaw portion 34 and leg portion 38, and between jaw portion 36 and leg portion 40.

Figure 4:
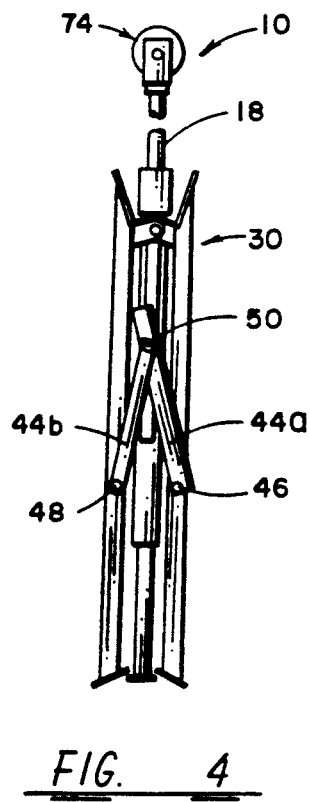
FIG. 4 is a side view of the jaw horse shown in FIG. 1 in its storage position.

Retractable bar 44 (a and b) extends laterally across between the mid-portion of leg portion 38 and the mid-section of leg portion 40. Retractable bar 44a is connected at one end to leg portion 38 with pin 46, and bar 44b is connected at one end with pin 48 to leg portion 40. Pin 50 connects retractable bar 44a to 44b. Retractable bar 44 as shown in FIG. 4 collapses about pin 50 so that locking member 32 and 30 rotate together about pivot 50 to collapse into a fold-up position. Retractable bars 44a and 44b expand outward to extend laterally between locking members 30 and 32 to limit the outward span of leg portions 38 and 40.

Referring to FIGS. 1–3, uni-leg assembly 14 includes an elongated main portion 52 having a rectangular cross-section integrally connected at one end to leg portion 54 which extends outward away from main portion 52 at an obtuse angle (φ). Jaw portions 34 and 36, also constructed of steel, pivot within leg portions 38 and 40 to clamp main portion 52. When clamped, jaw portions 34 and 36 securely hold main portion 5 in place and prevent sliding.

Referring to FIG. 1, leg portion 54 is preferably rectangular in cross-section and receives a telescopic leg portion 56 at one end. Leg portion 56 has a plurality of apertures 57. A pin 58 inserts through an aperture 60, leg portion 54 an aperture 57, in telescopic leg portion 56, out the other end of aperture 60. Preferably a cotter pin 64 is fed through aperture 66 of inserted pin 58 to hold pin 58 in place. Pin 58 limits the movement of telescopic leg portion 56 within leg portion 54. Aperture 57 sets the height of rectangular main portion 52. Although not shown, leg portions 38 and 40 may be operative to receive a telescopic leg portion like leg portion 56. By using these telescopic leg portions, the height as well as the angle of main portion 52 can be adjusted.

Elongated rod 18 is preferably threaded with threads 66 at one end and inserted into aperture 16 at its other end. A clamp 68 preferably includes a threaded screw 70 which extends through main portion 52 into aperture 16 to engage rod 18. Clamp 68 when turned, sets the amount of pressure that threaded screw 70 applies to elongated rod 18. Preferably screw 70 engages rod 18, to limit the upward and downward movement of rod 18 within aperture 16 and 10 to prevent the turning of rod 18.

Preferably screwably mounted on rod 18 through threads 66 is a removable head 20. Heads 20 are interchangeable, examples include a roller head 74, a ball transfer or ball head 76 and a flat drilled head 78. Roller head 74 includes a cylindrically shaped roller 80 having a pivot 82 extending through its axis and connected at both ends of roller 80 to a U-shaped bracket 84. U-shaped bracket 84 has a sleeve 86 which threadably engages with threads 66 of rod 18.

Figure 5:
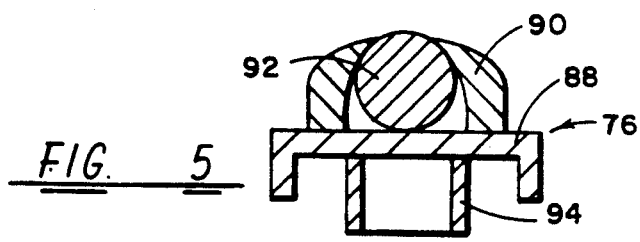
FIG. 5 is a section view of the roller head along line 5—5 of FIG. 1.

Another removable head 20 is ball head 76 having a rectangular flat plate 88 having semi-cylindrically shaped retaining rings 90 shown in cross-section in FIG. 5. Referring to FIGS. 1 and 5, semi-spherically shaped retaining rings 90 restrain balls 92. Retaining ring 90 is preferably attached to plate 88 using conventional means. Disposed on the bottom surface of plate 88 is sleeve 94 which also removably mates with threads 66.

Referring to FIG. 1, a third type of head 20 is drill head 78 having an elongated flat plate 98 preferably constructed with metal. Drilled out of plate 98 in a line are apertures 100 which are operative to receive a drill bit from a drill when material 28 (shown in FIG. 2) is placed on top of drill head 78. Disposed on the bottom surface of plate 98 is sleeve 86 which threadably mates with threads 66 of rod 18.

Referring to FIG. 1, an adjustable head 130 is shown with parallel side walls 132 and 134 and an aperture 136 extending therethrough. In one aspect of the invention main portion 52 disengages from jaws 34 and 36 and is replaced with head 130. Rod 18 holding head 20 is then inserted into aperture 136 to support material using bi-leg assembly only.

In another aspect of the invention a fixed head 140 shaped identically to head 28 replaces main portion 52 to hold material. Fixed head 140 has a sleeve 142 with facing parallel walls 144 and 146, and facing parallel walls 148 and 150. Head 140 may be oriented such that either walls 144 and 146 or walls 148 and 140 mate with jaws 34 and 36.

Referring to FIGS. 1–2, there is shown extension arm assemblies 22, 24 and 29 which are constructed identically. Referring to FIG. 1, extension arm assembly 24 includes an arm portion 104 integrally connected at one end to a U-shaped bracket portion 106 and at its other end to flange portion 108. U-shaped bracket preferably has a flange portion 110 which extends along one side of leg portion 38 and a second flange portion 112 which extends parallel to flange portion 110 on the other side of leg portion 38. Preferably an aperture 114 and 116 respectively are drilled through flange portion 110 and 112 A pin 118 extends through apertures 114 and 116 and is held in place with cotter pin 120.

To assemble arm extension 24, U-shaped bracket portion 106 is positioned around leg portion 38. Pin 118 extends through apertures 116 and 119. Extension arm assembly 24 is held in place on leg portion 38 with pin 18. Cotter pin 120 is fed through an aperture in pin 118 to hold it in place. Assembly 24 when attached to horse 10, supports a material object such as one designated by number 26 in FIG. 2.

Referring to FIG. 1, it is recognized by the inventor that L-shaped jaw portions 34 and 36 engage with main portion 52 to provide a stand in which rod 18 and heads 20 can rest. When bi-leg assembly 12 is in a vertical position while engaging with main portion 52, elongated rod 18 is positioned in a vertical orientation and the surface of plates 98, 88 and the axis of roller 80 are positioned in a horizontal orientation. However, when leg portion 40 is tilted as designated by arrow A, the slope of main portion 52 is angled downward as designated by arrow B. Main portion 52 angling causes rod 18 to be angled as designated by arrow C to change the angle of the top surface of plates 88 and 98 or the axis of roller 80 with respect to horizontal. It is also recognized that by placing extension arms 22 on jaw horse 10, in combination with using a head such as roller head 74 shown in FIG. 2, various materials or objects can be supported simultaneously across two jaw horses 10a and 10b shown in FIG. 2.

This concludes the description of the preferred embodiments A reading by those skilled in the art will bring to mind various changes without departing from the spirit and scope of the invention. It is intended, however, that the invention only be limited by the following appended claims.

What is claimed is:

1. A jaw horse apparatus comprising:
   a bi-leg assembly having a first and second locking member, said locking members being a leg portion and a jaw portion, said first locking member being pivotally connected to said second member between jaw portion and said leg portion;
   a uni-leg assembly having a main portion adopted to removably engage between said jaw portion adjacent one end of said main portion, and having a main leg integrally connected to the main portion and extending at an obtuse angle away from said main portion;
   an elongated rod having an axis extending longitudinally therethrough;
   an aperture extending through said main portion and operating to receive said rod to support said rod in a substantially vertical orientation;
   a removable head supported adjacent one end of said rod when said rod extends through said main portion, said head and rod rotatable about said axis when said rod extends through said main portion;
   a clamp attached to said main portion and engaging with said rod when said rod extends through said aperture, said clamp securely holding said rod in place to prevent said head from rotating and to prevent said rod from sliding in said aperture;
   a telescope leg portion slidably inserted into said main leg; and
   means for setting the length that said telescope leg extends out of said main portion to change the angle of said rod with respect to vertical.

2. The apparatus as recited in claim 1, further comprising a retractable bar extending laterally between the first leg portion and the second leg portion, said bar limiting the span between said leg portions, said bar pivoting about its mid portion to permit the leg portions to collapse toward each other to fold up the bi-leg assembly.

3. The apparatus as recited in claim 1, further comprising an extension arm assembly attached to said leg portion of said bi-leg assembly, said arm assembly having a U-shaped bracket portion partially surrounding said leg portion and having an arm portion extending outwardly away from said bracket portion and first and second leg portion.

4. The apparatus as recited in claim 3, wherein said arm assembly extends outward parallel to the ground.

5. The apparatus as recited in claim 3, wherein said head has a flat surface with a plurality of ball bearings resting thereon, said bearing being held in place with semi-spherical shaped retaining rings.

6. The apparatus as recited in claim 3, wherein said head includes a cylindrically shaped roller pivotally supported at its end by a u-shaped bracket, said bracket having means for mating with said rod.

7. The apparatus as recited in claim 3, wherein said bracket portion has a first and second flange portion extending parallel to each other, said first and second flange portion having an aperture operate to receive a pin; and
   wherein said bracket portion includes a pin extending through said aperture in said flange and operates to engage with the leg portion of the uni-leg assembly to hold said extension arm in place on said leg portion.

8. A jaw horse apparatus comprising:
   a bi-leg assembly having a first and second locking member, said locking members being a leg portion and a jaw portion, said first locking member being pivotally connected to said second member between jaw portion and said leg portion;
   a uni-leg assembly having a main portion adopted to removably engage between said jaw portion adjacent one end of said main portion, and having a main leg integrally connected to the main portion and extending at an obtuse angle away from said main portion an elongated rod;
   an aperture extending through said main portion and operating to receive said rod to support said rod in a vertical orientation;
   a removable head supported adjacent one end of said rod when said rod extends through said main portion;
   said head includes a flat plate with a plurality of apertures operative to receive a drill; and
   a clamp attached to said work piece and engaging with said rod when said rod extends through said aperture, said clamp securely holding said rod in place to prevent said head from turning and to prevent said rod from sliding in said aperture.

9. A method for supporting materials comprising the steps of:
   providing a vertically oriented bi-leg assembly having a first locking member with a first leg portion and a first jaw portion, and having a second locking member with a second leg portion and a second jaw portion;
   extending said leg portions diagonally deviated from said locking members;
   pivotally connecting said first locking member to said second locking member with a pivot;
   attaching said pivot onto said first and second locking members between said first leg portion and said first jaw portion, and between said second leg portion and said second jaw portion;
   providing a uni-leg assembly having an horizontally oriented elongated main portion and a third leg portion extending obtusely away from said main portion;
   engaging said main portion with said first and second jaw portion; and
   resting said first, second and third leg portions on the ground when the main portion engages with the first and second jaw portions;
   providing a first and second extension arm assembly having an adjustable bracket portion and an elongated arm portion extending away from said bracket portion;

attaching said bracket portion on said first extension arm assembly to either said first or second leg; and attaching said bracket portion on said second extension arm assembly to said third leg in a direction perpendicular to the direction of said first extension arm extends when said first extension arm is attached to either said first or second leg;

supporting shelves with said first or second arm assembly.

10. The method as recited in claim 9 further comprising the steps of:

providing an aperture in said main portion;

providing an elongated rod operative to extend through said aperture;

attaching a first head adjacent to one end of said rod;

extending said rod through said aperture to support said rod in a vertical orientation when said main portion engages with the jaw portion and when the first, second and third leg portions rest on the ground; and supporting an object on the attached head when the rod extends through the aperture.

11. The method as recited in claim 10, further comprising the steps of:

attaching a clamp to said main portion; and engaging said clamp with said rod to prevent movement of said rod in said aperture.

12. The method as recited in claim 10, further comprising the steps of:

removing said first head from said rod; and placing a different style of head onto said rod after said first head is removed.

13. The method as recited in claim 9, further comprising the steps of:

providing a telescopic leg portion;

inserting the telescopic leg portion into one of the leg portions;

providing a first extension arm assembly having a bracket portion and an elongated arm portion extending away from said bracket portion;

attaching the bracket portion to either the first, second or third leg portion;

extending the bracket at least partially around the leg portion when the extension arm is attached;

providing a second shelf support assembly;

extending a shelf with a flat top surface from the arm portion to a second support assembly;

supporting the top surface of the shelf on the arm portion in a substantially horizontal orientation when the bracket portion is attached;

adjusting the level of the extension arm with respect to the second shelf support assembly, to change the orientation of the shelf top surface to horizontal; and adjusting the extension of the telescopic leg portion to change the horizontal pitch of the shelf.

14. The method as recited in claim 13, further comprising the steps of:

attaching a second extension arm assembly on one of the legs below the first extension arm assembly; and supporting an object on the arm portion of the second extension arm assembly.

15. The method as recited in claim 10, further comprising the steps of:

removing the object from the attached head;

disengaging main portion from the first and second jaw; and pivoting the first leg portion toward the second leg portion to fold up the bi-leg assembly.

16. The method as recited in claim 9, further comprising the steps of:

providing a first, second and third telescopic leg portion;

inserting the first, second and third telescopic leg portions into their respective first, second and third leg portion; and adjusting the amount that the first, second or third telescopic leg portions are inserted into the respective first, second or third leg portion to change orientation of the main portion.

17. The method as recited in claim 9, further comprising the steps of:

changing the orientation of the main portion with respect to horizontal by changing the angle of the bi-leg assembly with respect to vertical.

18. The method as recited in claim 9, further comprising the step of:

disengaging the main portion from the jaw portion;

providing a head portion having parallel side walls and an aperture extending therethrough;

engaging the side walls of the head portion with the first and second jaw portion;

extending the rod through the aperture in the head portion; and attaching the first head to the rod to support material on the head portion when the rod extends through the aperture in the head portion in a vertical orientation.

19. A jaw horse apparatus for supporting work materials comprising:

a substantially vertically oriented bi-leg assembly having a first locking member pivotally connected to a second locking member, said locking members having a rectangular cross section leg portion and a jaw portion at one end of the leg portions, said jaw portion having in cross-section an L-shaped bracket, a retractable brace bar extending laterally across a middle of said leg portion and operative when fully extended to limit the expansion of the span between the leg portions;

a uni-leg assembly having an elongated main portion with a substantially rectangular shaped cross section adapted to be removably engaged between the L-shaped bracket of the jaw portion of the first and second locking member, said uni-leg assembly having a leg portion with a rectangular cross-section and forming an obtuse angle with the main portion;

a cylindrically shaped aperture extending through said main portion and having substantially vertical orientation when said main portion rests between the jaws of the substantially vertical bi-leg assembly;

an elongated circular rod extending through the aperture and having a head removably attached to one end of the rod above the main portion;

clamp means extending through said main portion and engaging said rod for enabling said disabling movement of the rod within the aperture to change the level of the head;

an extension arm assembly having a bracket portion attached to one of said leg portion and having an elongated arm portion extending away from said bracket portion;

said arm portion operative to support an object when said extension arm is attached to one of said legs;

said bracket portion including means for adjusting at variable intervals the level of said arm portion to maintain a fixed distance between the level of the head and the level of the arm portion when the level of the head is charged.

a second shelf support assembly;

a shelf with a flat top surface extending from the arm portion to the second shelf support assembly;

said top surface of the shelf on the arm portion being supported in a substantially horizontal orientation when the bracket portion is attached;

means for adjusting the level of the extension arm with respect to the second shelf support assembly, to change the orientation of the shelf top surface to horizontal; and means for adjusting the extension of the telescopic leg portion to change the horizontal pitch of the shelf.

20. The apparatus as recited in claim 19, wherein the extension arm assembly attached to said leg or said leg portion has a U-shaped bracket portion partially surrounding said leg portion, said arm assembly extending outwardly away from said bracket portion substantially parallel to the ground and operative to support materials; and wherein the extension arm assembly has means including a pin extending through said U-bracket and engaging with said leg or said leg portion for holding said extension arm in place at any position along said leg of said jaw horse.

* * * * *